United States Patent
Yau et al.

(10) Patent No.: US 10,319,202 B2
(45) Date of Patent: Jun. 11, 2019

(54) SIMULTANEOUS EVENT CAPTURE AND ALERT GENERATION

(71) Applicant: The Chamberlain Group, Inc., Oak Brook, IL (US)

(72) Inventors: Herman Yau, Palo Alto, CA (US); Ronald G. Pace, Naperville, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 788 days.

(21) Appl. No.: 13/965,196

(22) Filed: Aug. 13, 2013

(65) Prior Publication Data

US 2015/0049189 A1  Feb. 19, 2015

(51) Int. Cl.
*G08B 13/196* (2006.01)

(52) U.S. Cl.
CPC . *G08B 13/19697* (2013.01); *G08B 13/19656* (2013.01)

(58) Field of Classification Search
None
See application file for complete search history.

(56) References Cited

U.S. PATENT DOCUMENTS

| | | | | |
|---|---|---|---|---|
| 6,970,183 B1* | 11/2005 | Monroe | | G08B 7/062 348/143 |
| 2009/0100176 A1* | 4/2009 | Hicks, III | | G06F 15/16 709/224 |
| 2009/0261967 A1* | 10/2009 | Chen | | G08B 25/006 340/531 |
| 2012/0239822 A1* | 9/2012 | Poulson | | H04L 41/0668 709/239 |
| 2013/0135990 A1* | 5/2013 | Draznin | | H04W 48/17 370/221 |
| 2013/0170335 A1* | 7/2013 | Pace | | H04W 76/10 370/218 |
| 2013/0182107 A1* | 7/2013 | Anderson | | G08B 21/02 348/143 |

* cited by examiner

*Primary Examiner* — Kate H Luo
(74) *Attorney, Agent, or Firm* — Fitch Even Tabin & Flannery LLP

(57) ABSTRACT

A method and a system provide a security system for simultaneously capturing events and generating alerts for security. The security system communicates with a data management server via a network. The security system includes an image capture device integrated with a wireless access point, a gateway device, and one or more alarm devices. The security system simultaneously receives event data associated with events from the image capture device and one or more electronic devices connected to the wireless access point, and alarm data simultaneously recorded by the alarm devices based on detection of one or more security conditions. The security system generates alerts for security using the simultaneously received event data and the recorded alarm data. The security system transmits the simultaneously received event data, the recorded alarm data, and the generated alerts to the data management server accessible by a control device and the electronic devices via the network.

26 Claims, 8 Drawing Sheets

SIMULTANEOUS EVENT CAPTURE AND ALERT GENERATION

BACKGROUND

A video surveillance system and an alarm system are complementary systems that are typically deployed together to secure a premises, for example, a home, a business, etc. The video surveillance system records and collects video evidence in the event of a break-in, while an alarm system secures a premises and sends out alerts on detection of intrusions. Due to the complexity of these systems, the surveillance system and the alarm system require installation by professional technicians. Furthermore, since the video surveillance system and the alarm system are two separate systems, merging data from both the systems needs additional software to allow the user to correlate the alarm data with the video data to obtain a complete picture of an intrusion event. The complexities of installing two separate systems and incorporating additional software for merging data output from the two systems increase the cost and negatively impact a fast adoption of such systems for home and business applications.

A conventional alarm system incorporates a master gateway device to which wired or wireless electronic devices, for example, sensors connect. The master gateway device typically includes a communication channel, for example, a phone line, a cellular network adaptor, the internet, etc. The master gateway device relays an alarm signal to a central station or to a user's computing device. Depending on the design of the system, the gateway device can be built into an alarm panel, for example, in the form of a box, or implemented on a separate internet gateway. The conventional design provides one master gateway device per site which controls multiple electronic devices, for example, alarm sensors and other devices for the site.

The video surveillance system architecture is similar to a security setup. The conventional video surveillance system comprises a master unit, for example, a digital video recorder (DVR) that connects to each camera unit by a cable and records and stores the video captured by the camera unit. This video surveillance system architecture is typically configured as a standalone system commonly referred to as a closed-circuit television (CCTV). In recent years, the DVRs have incorporated internet protocol (IP) connectivity to allow for remote viewing and control over the Internet. The alarm system and the video surveillance system complement each other and are both installed to secure a premise. However, because these systems are installed separately and run independent of each other, in order to review any event, a user has to access two separate systems and manually line up data, or install additional integration software to merge the data from both the systems together, which results in inefficiencies and an increase in costs.

Hence, there is a long felt but unresolved need for a method and a system that incorporate a combination of a surveillance system and alarm devices in a single security system to enable ease of installation and simultaneous capture of events and generation of alerts for security and an easy review of events without having to access two separate systems, thereby reducing costs and enabling a fast adoption of a security system for home and business applications. Moreover, there is a need for a method and a system that redirect connection of electronic devices from inactive security systems to active security systems to allow continuous capture of events and generation of alerts for security in a network of security systems. Furthermore, there is a need for a method and a system that enables security systems that are disconnected from a network to transmit simultaneously received event data and alarm data, and alerts to active security systems that are connected to the network. Furthermore, there is a need for a method and a system that sustain an active connection of the security systems to a network for enabling continuous capture of events and generation of alerts for security in a network of security systems.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the system disclosed herein address the above mentioned needs for incorporating a combination of a surveillance system and alarm devices in a single security system to enable easy installation and simultaneous capture of events and generation of alerts for security and an easy review of events without having to access two separate systems, thereby reducing costs and enabling a fast adoption of a security system for home and business applications. The method and the system disclosed herein combine alarm devices, for example, alarm sensors with an image capture device, for example, a network camera to provide an integrated solution tied together with a server backend that is easy to install and cost effective. By combining the functionality of a gateway device, the image capture device, and the alarm devices in a single security system, the cost of the security system is reduced. The method and the system disclosed herein provide a camera-centric alarm system that combines the surveillance system, for example, the image capture device and the alarm devices, instead of having a separate alarm panel and a separate master gateway device. The method and the system disclosed herein integrate the image capture device with the master gateway device and the alarm devices.

The method and the system disclosed herein provide a security system comprising at least one processor configured to simultaneously capture events and generate alerts for security. The security system further comprises an image capture device, a wireless access point, a gateway device, and one or more alarm devices. As used herein, the term "image capture device" refers to a device, for example, a wireless network camera, an image sensor, an image recorder, etc., that records images such as still images, moving images, etc., that can be stored directly and/or transmitted to another location, for example, to a computing device. The image capture device is configured to capture event data associated with multiple events. As used herein, the term "event data" refers to computer readable data, for example, audiovisual data, snapshot data, video data, image data, multimedia data, etc., or any combination thereof, associated with events performed by an electronic device, for example, based on an action, a characteristic, a condition or a state, a state change, behavior, performance, etc., of the electronic device. The wireless access point is integrated in the image capture device. As used herein, the term "wireless access point" refers to a device that allows wireless electronic devices to connect to a network, for example, using Wi-Fi® of the Wireless Ethernet Compatibility Alliance, Inc. The wireless access point is configured to directly connect a user's control device and multiple electronic devices to the security system, and to route the user's control device and the electronic devices to a network. The wireless access point provides a path to the network, for example, via a wireless router, a modem, etc., operably connected to the security system.

The gateway device is integrated in the image capture device. As used herein, the term "gateway device" refers to a device configured to operably couple to a network, for example, the internet, and also to couple wirelessly through the wireless access point to one or more electronic devices. The gateway device is configurable with one or more application programs to monitor and/or control one or more electronic devices. The gateway device is configured, for example, as a box, an alarm panel, or a separate internet gateway. The gateway device communicates with the image capture device, the control device, and one or more electronic devices, and monitors, manages, and receives the event data associated with multiple events from the image capture device and one or more electronic devices. The user's control device and the electronic devices connect to the gateway device of the security system via the wireless access point. The alarm devices operably connect to the gateway device. As used herein, the term "alarm devices" refers to one or more sensors, devices, or systems that generate an audible, visual, or other type of alarm signal about a problem or a condition. The alarm devices record alarm data based on detection of one or more security conditions. As used herein, the term "alarm data" refers to data collected on detection of a security condition, that is, an abnormal condition or an unauthorized event performed by one or more unauthorized electronic devices or one or more unauthorized users. Also, as used herein, the term "security conditions" refers to intrusions, abnormal conditions, or unauthorized events within and around the security system indicating a presence or a nature of an abnormality. The security conditions comprise, for example, any unauthorized intrusion into a premises, for example, a house, a shop, a building, etc., or a network path by an unauthorized user, any unauthorized intrusion by unauthorized devices attempting to access and control the security system, etc.

The security system disclosed herein simultaneously receives event data associated with one or more events and records alarm data. The security system simultaneously receives the event data from the image capture device of the security system and from the electronic devices, and alarm data simultaneously recorded by the alarm devices of the security system based on the detection of one or more security conditions. Examples of security conditions are any unauthorized intrusion into a premises, an unauthorized intrusion into the network by an electronic device such as an unauthorized camera or a sensor trying to access the network of the security system, etc. The security system generates alerts for security using the simultaneously received event data and recorded alarm data.

The security system is configured to communicate with a data management server via the network. The data management server is accessible by the user's control device and multiple electronic devices via the network. The security system transmits the simultaneously received event data and recorded alarm data, and the generated alerts to the data management server via the network. The data management server comprises at least one processor configured to process and store the simultaneously received event data and the recorded alarm data, and the generated alerts in a database. In an embodiment, the data management server transmits the generated alerts to the user's control device via the network. In another embodiment, the security system transmits the generated alerts to the user's control device directly or via a network. In an embodiment, the method and the system disclosed herein provide a security management application executable by at least one processor on the user's control device. The control device communicates with the security system via the wireless access point of the security system. The security management application accesses, configures, and controls the security system through the wireless access point of the security system.

Disclosed herein are also a method and a system for simultaneously and continuously capturing events and generating alerts for security. The method and the system disclosed herein redirects connection of electronic devices, for example, wired or wireless sensors, tracking devices, alarm sensors, etc., from inactive security systems to active security systems to allow continuous capture of events and generation of alerts for security in a network of security systems. In an embodiment, the method and the system disclosed herein provide multiple security systems communicatively coupled to each other via a wireless access point and to the data management server via a network through one or more of multiple connection modes. As used herein, the term "connection mode" refers to a mode of connecting the security system to a network. The connection modes comprise, for example, a cellular data connection such as a third generation mobile communication mode, a fourth generation mobile communication mode, etc., a broadband connection, a digital subscriber line (DSL) communication mode, an ultra-wide band (UWB) communication mode, a wireless communication mode, a network that implements Wi-Fi® of the Wireless Ethernet Compatibility Alliance, Inc., a wired communication mode via coaxial cables, copper wires, fiber optic cables, cellular modems, local area network (LAN) cables, etc. Each of the security systems comprises at least one processor configured to simultaneously capture the events and generate alerts for security. Each of the security systems further comprises the image capture device, the wireless access point, the gateway device, and one or more alarm devices as disclosed above.

Each of the security systems simultaneously receives event data associated with one or more events and records alarm data. The security systems are configured to simultaneously receive the event data from their respective image capture devices and from the electronic devices that connect to them via their respective wireless access points, and alarm data simultaneously recorded by their respective alarm devices based on detection of one or more security conditions by each of the security systems. Each security system generates alerts for security using the simultaneously received event data and recorded alarm data. One or more of the security systems transmit the simultaneously received event data and the recorded alarm data, and the generated alerts to the data management server via the network based on an active connection of each of those security systems to the network via one or more connection modes. The security systems with an active connection to the network are herein referred to as "active security systems".

The method and the system disclosed herein enable security systems that are disconnected from a network to transmit the simultaneously received event data and recorded alarm data, and the generated alerts to active security systems that are connected to the network. If the active connection of other security systems via other connection modes is disabled, the other security systems transmit the simultaneously received event data and the recorded alarm data, and the generated alerts to the active security systems via the wireless access point of each of the active security systems. In an embodiment, if one or more security systems in the network fail, the connections of the electronic devices to the gateway device of those security systems are redirected to the gateway device of one or more of the active security systems. The active security systems then transmit the simultaneously received event data and the recorded alarm data, and the generated alerts to the data management server via the network for processing, storage, and alerting the user's control device. In an embodiment, the method and the system disclosed herein sustain an active connection of each of the security systems to the network for enabling continuous capture of events and generation of alerts for security in a network of security systems. In this embodiment, an energy storage device is integrated in each of one or more of the security systems for powering those security systems and sustaining the active connection of each of those security systems to the network via one or more connection modes.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1A:
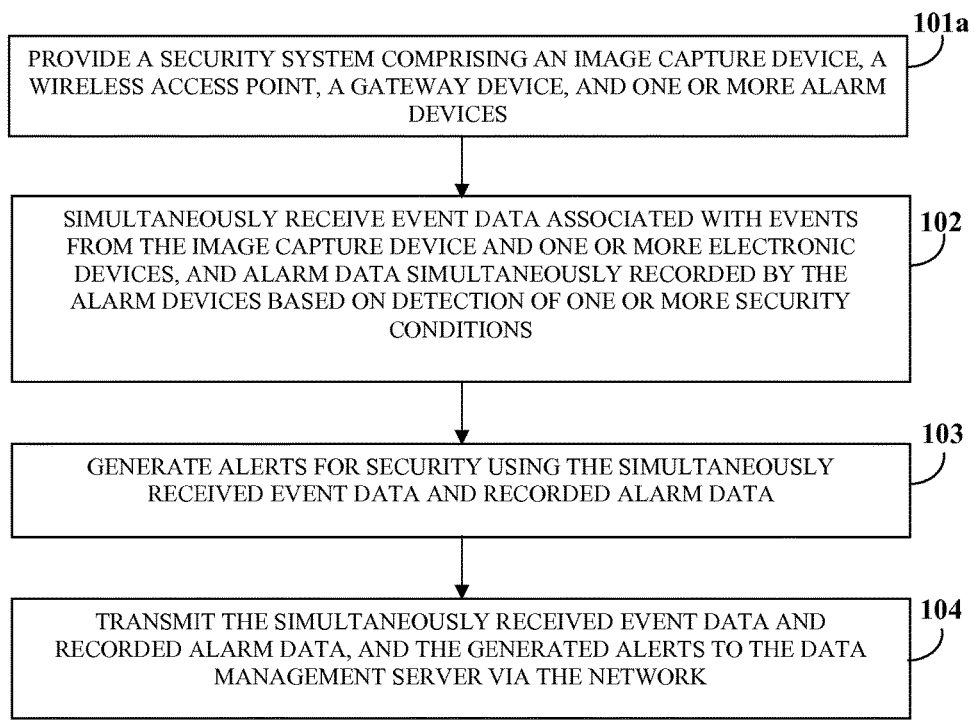
FIG. 1A illustrates a method for simultaneously capturing events and generating alerts for security.

FIG. 1A illustrates a method for simultaneously capturing events and generating alerts for security. The method disclosed herein provides 101a a security system comprising at least one processor configured to simultaneously capture events and generate alerts for security applications, for example, for detecting an intrusion, an abnormal condition, or an unauthorized intrusion into an area or a network. The security system comprises an image capture device, a wireless access point, a gateway device, and one or more alarm devices. The image capture device is configured to capture event data associated with multiple events. As used herein, the term "image capture device" refers to a device, for example, a wireless network camera, an image sensor, an image recorder, etc., that records images such as still images, moving images, etc., that can be stored directly and/or transmitted to another location, for example, to a computing device. Also, as used herein, the term "event data" refers to computer readable data, for example, audiovisual data, snapshot data, video data, image data, multimedia data, etc., or any combination thereof, associated with events performed by an electronic device, for example, based on an action, a characteristic, a condition or a state, a state change, behavior, performance, etc., of the electronic device.

The wireless access point is integrated in the image capture device. As used herein, the term "wireless access point" refers to a device that allows wireless electronic devices to connect to a network, for example, using Wi-Fi® of the Wireless Ethernet Compatibility Alliance, Inc. The wireless access point is configured to directly connect a user's control device and multiple electronic devices to the security system, and to route the user's control device and the electronic devices to a network. As used herein, the term "user" refers to a person or entity that is in possession of the control device for wirelessly configuring and controlling the security system, and for receiving alerts from the security system for security. Also, as used herein, the term "control device" refers to an electronic device, for example, a mobile phone, an internet enabled mobile device, a personal computer, a tablet computing device, a mobile computer, a smart phone, a laptop, a personal digital assistant, a touch centric device, a workstation, a client device, a portable electronic device, a network enabled computing device, an interactive network enabled communication device, etc., used for wirelessly configuring and setting up the security system via the wireless access point of the security system, accessing a data management server via the network, receiving the alerts from the security system, etc. The electronic devices that connect to the security system via the wireless access point comprise, for example, wired or wireless surveillance sensors such as proximity sensors, contact sensors, passive infrared (PIR) motion sensors, audio sensors, water sensors, etc., monitoring devices, tracking devices, surveillance devices such as a Wi-Fi® enabled cameras, etc., alarm sensors, a personal computer, a tablet computing device, a mobile computer, a mobile phone, a smart phone, a laptop, a personal digital assistant, a touch centric device, a workstation, a client device, a network enabled computing device, an interactive network enabled communication device, a gaming device, a set top box, a television, an image capture device, a web browser, a video recorder, an audio recorder, a global positioning system (GPS) device, any other suitable computing equipment, and combinations of multiple pieces of computing equipment, etc.

If the alarm is tripped and the network is unavailable, the electronic devices operate locally via a direct connection to the wireless access point of the security system to trigger the alarm devices of the security system. The network is, for example, a wireless network, a network that implements Wi-Fi® of the Wireless Ethernet Compatibility Alliance, Inc., an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area communication network, an internet connection network, an infrared communication network, etc., or a network formed from a combination of these networks. In an embodiment, the image capture device itself has a built in routing capability and can serve as the wireless access point in instances of, for example, network unavailability, tripping of an alarm, etc., which allows a user to connect directly to the security system using the control device, for example, a smart phone or an internet enabled device and configure the security system directly, without the need for an additional router or a personal computer to set up the configuration. The wireless access point provides a path to the network, for example, via a wireless router, a modem, etc., operably connected to the security system.

The gateway device is integrated in the image capture device. As used herein, the term "gateway device" refers to a device configured to operably couple to a network, for example, the internet, and also to couple wirelessly through the wireless access point to one or more electronic devices. The gateway device is configurable with one or more application programs to monitor and/or control one or more electronic devices. The gateway device is configured, for example, as a box, an alarm panel, or a separate internet gateway. The gateway device communicates with the image capture device, the control device, and one or more of the electronic devices, and monitors, manages, and receives event data associated with multiple events from the image capture device and one or more electronic devices. The control device and the electronic devices connect to the gateway device of the security system via the wireless access point. The alarm devices are operably connected to the gateway device. As used herein, the term "alarm devices" refers to one or more sensors, devices, or systems that generate an audible, visual, or other type of alarm signal about a problem or a condition. The alarm devices record alarm data based on detection of one or more security conditions. As used herein, the term "alarm data" refers to data collected on detection of a security condition, that is, an abnormal condition or an unauthorized event performed by one or more unauthorized electronic devices or one or more unauthorized users. Also, as used herein, the term "security conditions" refers to intrusions, abnormal conditions, or unauthorized events within and around the security system indicating a presence or a nature of an abnormality. The security conditions comprise, for example, any unauthorized intrusion into a premises, for example, a house, a shop, a building, etc., or a network path by an unauthorized user, any unauthorized intrusion by unauthorized devices attempting to access and control the security system, etc. The alarm data comprises data on any change in the status of an electronic device from a steady state or a normal condition. For example, the alarm data comprises data obtained on detection of an unauthorized intrusion into an area or the network by unauthorized users via motion detection triggers due to a door opening or a window opening, vibration detection triggers due to a window breaking, etc. In an example, the alarm devices record a status change from a sensor due to an intrusion, for example, a door opening, a window opening, a window breaking, etc., to indicate an unauthorized event or entry.

The security system simultaneously receives 102 event data associated with the events and records alarm data. The security system simultaneously receives the event data from the image capture device of the security system and from the electronic devices, and alarm data simultaneously recorded by the alarm devices of the security system based on the detection of one or more security conditions. The security system generates 103 alerts for security using the simultaneously received event data and recorded alarm data. The security system is configured to communicate with the data management server via the network. The data management server is accessible by the user's control device and the electronic devices via the network. The security system transmits 104 the simultaneously received event data and the recorded alarm data, and the generated alerts to the data management server via the network. The data management server comprises at least one processor configured to process and store the simultaneously received event data and the recorded alarm data, and the generated alerts in a database. The data management server transmits the generated alerts to the control device via the network. The data management server transmits the generated alerts to the control device, for example, via electronic mail (email), a short message service (SMS) message, a multimedia messaging service (MMS) message, etc.

In an embodiment, the method disclosed herein further provides a security management application executable by at least one processor on the user's control device. The user's control device communicates with the security system via the wireless access point of the security system. In an embodiment, the security management application is configured as a mobile application with alarm panel control functions on the user's control device. The security management application accesses, configures, and controls the security system through the wireless access point of the security system. The security management application on the control device guides a user to a successful set-up of the entire security system, step by step. The wireless access point built into the security system enables an easy wireless set-up through the security management application on the user's control device.

Figure 1B:
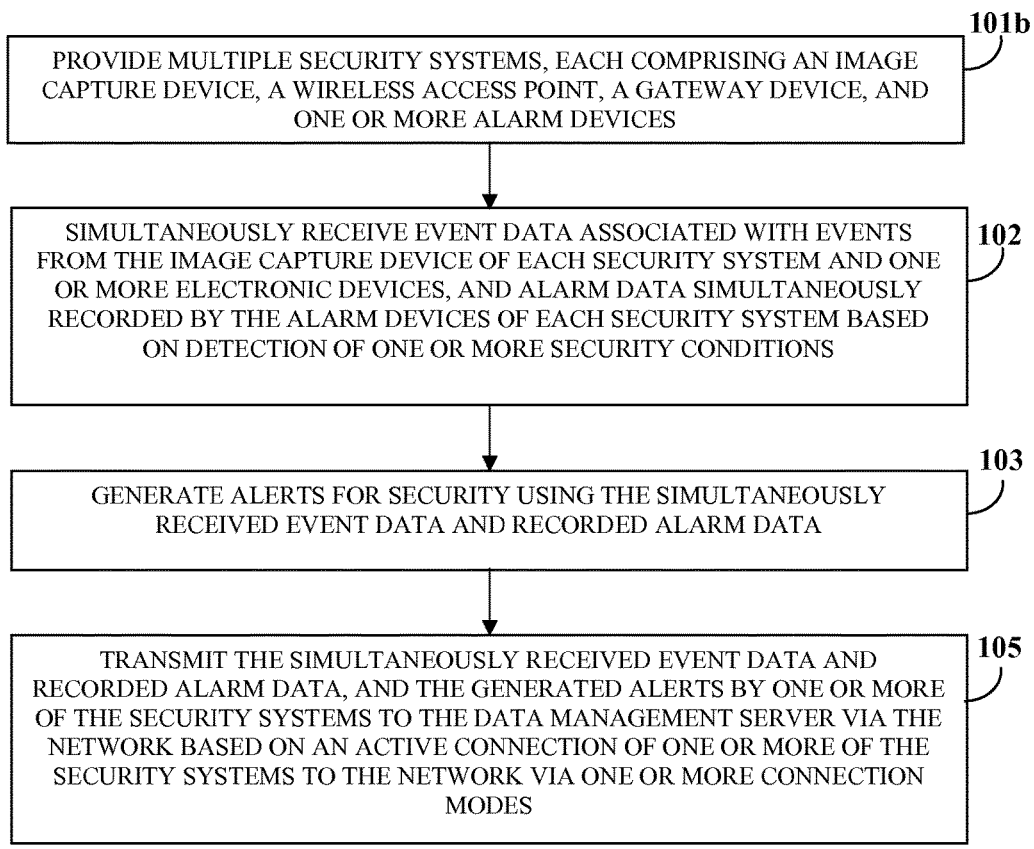
FIG. 1B illustrates a method for simultaneously and continuously capturing events and generating alerts for security.

FIG. 1B illustrates a method for simultaneously and continuously capturing events and generating alerts for security. In an embodiment, the method and the system disclosed herein provide 101b multiple security systems communicatively coupled to each other via the wireless access point and to the data management server via a network through one or more of multiple connection modes. As used herein, the term "connection mode" refers to a mode of connecting the security system to a network. The connection modes comprise, for example, a cellular data connection such as a third generation (3G) mobile communication mode, a fourth generation (4G) mobile communication mode, etc., a broadband connection, a digital subscriber line (DSL) communication mode, an ultra-wide band (UWB) communication mode, a wireless communication mode, a network that implements Wi-Fi® of the Wireless Ethernet Compatibility Alliance, Inc., a wired communication mode via coaxial cables, copper wires, fiber optic cables, cellular modems, local area network (LAN) cables, etc. Each of the security systems comprises at least one processor configured to simultaneously capture the events and generate alerts for security.

Each of the security systems further comprises the image capture device, the wireless access point, the gateway device, and one or more alarm devices as disclosed in the detailed description of FIG. 1A. Each of the security systems simultaneously receives event data associated with one or more events and records alarm data. The security systems simultaneously receive 102 the event data from their respective image capture devices and from the electronic devices that connect to them via their respective wireless access points, and alarm data simultaneously recorded by their respective alarm devices based on detection of one or more security conditions by each of the security systems. Each security system generates 103 alerts for security using the simultaneously received event data and recorded alarm data. One or more of the security systems transmit 105 the simultaneously received event data and the recorded alarm data, and the generated alerts to the data management server via the network based on an active connection of each of those security systems to the network via one or more connection modes. The security systems with an active connection to the network are herein referred to as "active security systems".

If the active connection of other security systems via other connection modes is disabled, the other security systems transmit the simultaneously received event data and the recorded alarm data, and the generated alerts to the active security systems via the wireless access point of each of the active security systems. Consider an example where one of the security systems, exemplarily referred to as an "active security system" at a site has a cellular 3G or 4G connection to the internet while another security system is connected to the internet via a broadband connection. When there is an internet outage on the broadband connection that the other security system is connected to, the other security system switches and connects to the active security system with the cellular 3G or 4G connection, thereby allowing the active security system to route the data traffic from the other security system to the data management server via the cellular 3G or 4G connection.

In an embodiment, if one or more security systems in the network fail, the connections of the electronic devices to the gateway device of those security systems are redirected to the gateway device of each of the active security systems. The active security systems then transmit the simultaneously received event data and the recorded alarm data, and the generated alerts to the data management server via the network for processing, storage, and alerting the user's control device. In another embodiment, an energy storage device is integrated in each of one or more of the security systems for powering those security systems and sustaining the active connection of each of those security systems to the network via one or more connection modes. For example, one of the security systems, exemplarily referred to as an "active security system" is configured with a cellular data access connection and integrated with a battery to allow battery operated sensors at a site to fail over to the gateway device of the active security system and resume operation, in the event of an internet outage or a power outage. As used herein, the term "fail over" refers to an ability of the security system to transfer operations to another security system without interrupting operations or the process flow, upon failure or abnormal termination of an active connection.

Figure 2:
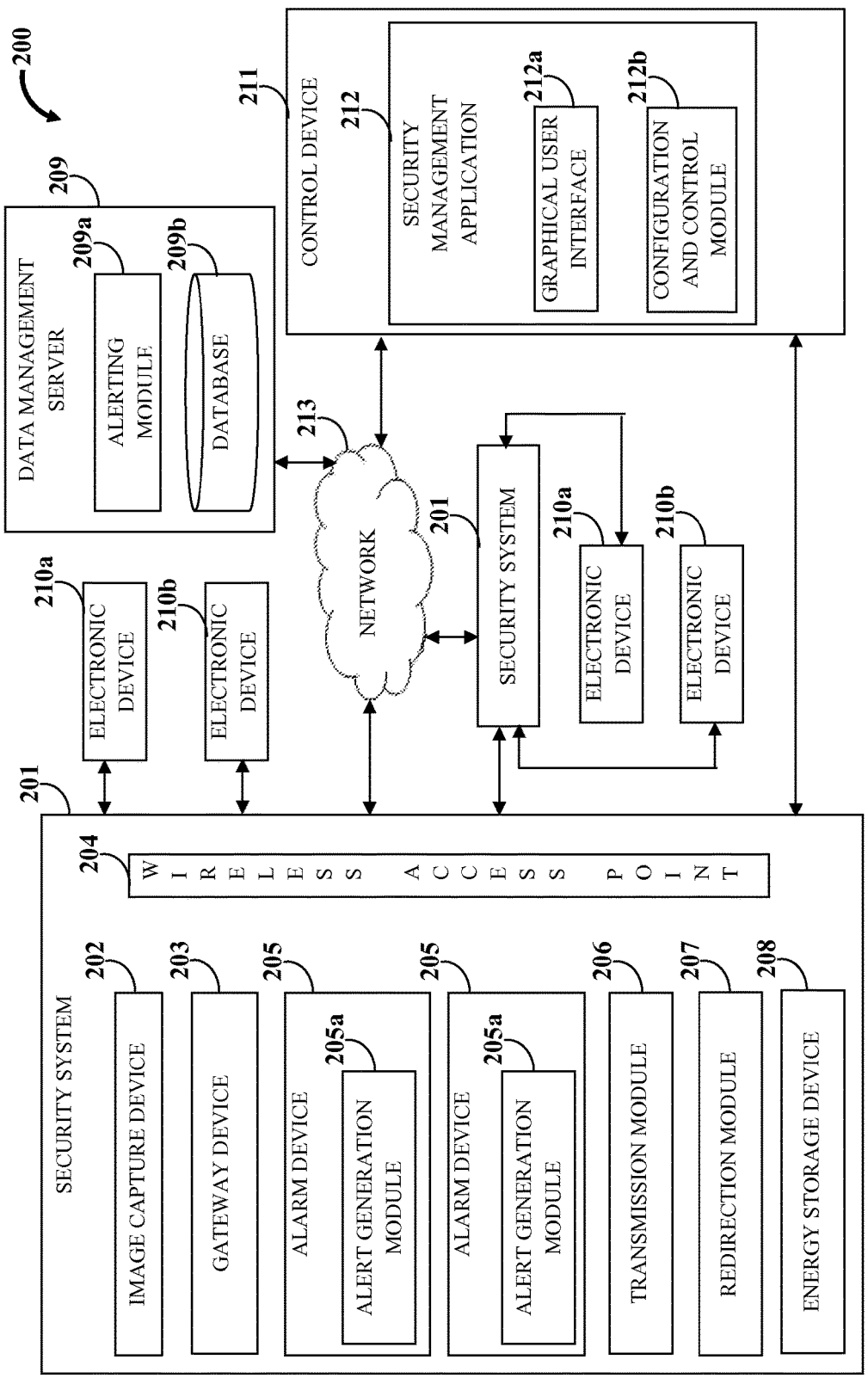
FIG. 2 illustrates a system for simultaneously and continuously capturing events and generating alerts for security.

FIG. 2 illustrates a system 200 for simultaneously and continuously capturing events and generating alerts for security. The system 200 disclosed herein comprises one or more security systems 201, a data management server 209, and a security management application 212 provided on a user's control device 211. The security systems 201 are communicatively coupled to each other via their wireless access points 204 and to the data management server 209 via the network 213. Each security system 201 comprises at least one processor and a non-transitory computer readable storage medium communicatively coupled to the processor. The non-transitory computer readable storage medium is configured to store modules, for example, 205a, 206, 207, etc., of the security system 201. The processor executes the modules, for example, 205a, 206, 207, etc., of the security system 201. The security system 201 further comprises the image capture device 202, the gateway device 203, the wireless access point 204, one or more alarm devices 205, and a transmission module 206. The image capture device 202 of the security system 201 captures event data, for example, image data, video data, audiovisual data, multimedia data, etc., or any combination thereof, associated with the events. The wireless access point 204 integrated in the image capture device 202 directly connects the control device 211 and the electronic devices, 210a, 210b, etc., to the security system 201. The wireless access point 204 also routes the control device 211 and electronic devices, 210a, 210b, etc., to the network 213. For example, the system 200 disclosed herein implements the wireless access point 204 and routing functionality to support a direct connection, for example, from smart phones and internet devices to the security system 201 for easy configuration, and to support connection by other wireless devices such as Wi-Fi® enabled devices and to route them to the internet.

The gateway device 203 integrated or built into the image capture device 202 communicates, monitors, manages, and receives event data associated with the events from the image capture device 202 and one or more electronic devices 210a and 210b. The control device 211 and one or more electronic devices 210a and 210b connect to the gateway device 203 of each security system 201 via the wireless access point 204. One or more alarm devices 205, for example, wireless alarm sensors and devices operably connected to the gateway device 203 record alarm data based on detection of one or more security conditions, simultaneously with the capture of the event data performed by the image capture device 202 and the electronic devices 210a and 210b. The alarm devices 205 provide the recorded alarm data to the gateway device 203 of the security system 201. Each of the alarm devices 205 comprises an alert generation module 205a. The alert generation module 205a generates alerts for security using the simultaneously received event data and the recorded alarm data. Since the gateway device 203, the image capture device 202, and the alarm devices 205 are integrated together in the security system 201, the security system 201 simultaneously integrates and captures alarm sensor and video events and other media events together. The image capture device 202 and the alarm devices 205 are configured together as a standalone mini alarm system. Since the security system 201 is aware of the status of the integrated image capture device 202 and the alarm devices 205, the security system 201 triggers recording and sends alerts when a specific anomaly occurs as detected by the integrated image capture device 202 and the alarm devices 205.

The transmission module 206 of the security system 201 transmits the simultaneously received event data and the recorded alarm data, and the generated alerts to the data management server 209 via the network 213. In an embodiment, the transmission module 206 of each of the security systems 201 transmits the simultaneously received event data and the recorded alarm data, and the generated alerts from one or more of the security systems 201 to the data management server 209 via the network 213 based on an active connection of each of the active security systems 201 to the network 213 via one or more connection modes, for example, a cellular data connection, a broadband connection, etc. In an embodiment, if the active connection of each of the other security systems 201 via other connection modes is disabled, the transmission module 206 of each of the other security systems 201 transmits the simultaneously received event data and the recorded alarm data, and the generated alerts from each of the other security systems 201 to the active security systems 201 via the wireless access point 204 of each of the active security systems 201. The transmission module 206 of each of the active security systems 201 then transmits the simultaneously received event data and the recorded alarm data, and the generated alerts to the data management server 209 via the network 213 for processing, storage, and alerting the user's control device 211.

In another embodiment, each security system 201 further comprises a redirection module 207 for redirecting the connections of the electronic devices 210a and 210b from their respective gateway devices 203, to the gateway device 203 of each of the active security systems 201, on failure of a security system 201. In another embodiment, each security system 201 further comprises an energy storage device 208 for powering and sustaining an active connection of the security system 201 to the network 213 via one or more connection modes, for example, a broadband connection, a cellular data connection, etc.

The data management server 209 of the system 200 disclosed herein, accessible by the user's control device 211 and the electronic devices 210a, 210b, etc., via the network 213 comprises at least one processor configured to process the simultaneously received event data and the recorded alarm data, and the generated alerts, in communication with the security systems 201. The data management server 209 facilitates remote connection over the network 213, for example, the internet, stores and records event data from the image capture device 202 and the electronic devices 210a, 210b, etc., and alarm data from the alarm devices 205 of the security system 201, authenticates users, and sends out alerts such as alarm notifications when an alarm or an alert is triggered. The data management server 209 further comprises a database 209b and an alerting module 209a. The database 209b stores the simultaneously received event data and the recorded alarm data, and the generated alerts. In an embodiment, the database 209b is a cloud database that runs on a cloud computing platform, for example, PC Backup™ of MyPCBackup, Ltd., Amazon EC2 of Amazon Technologies Inc., GoGrid® of GoGrid, LLC, the Rackspace® cloud of Rackspace US, Inc., etc. The alerting module 209a of the data management server 209 transmits the generated alerts to the control device 211 via the network 213.

The security management application 212 is executable by at least one processor on the control device 211. The security management application 212 communicates with each of the security systems 201 via the wireless access point 204 of each of the security systems 201. The security management application 212 comprises a graphical user interface (GUI) 212a and a configuration and control module 212b. The configuration and control module 212b accesses each security system 201 via the GUI 212a and configures, manages, and controls the security system 201 wirelessly through the wireless access point 204, via the GUI 212a. In an embodiment, the configuration and control module 212b activates and deactivates the security system 201 through the wireless access point 204. In another embodiment, the configuration and control module 212b changes security settings of the security system 201 through the wireless access point 204 based on the user's preferences.

Figure 3:
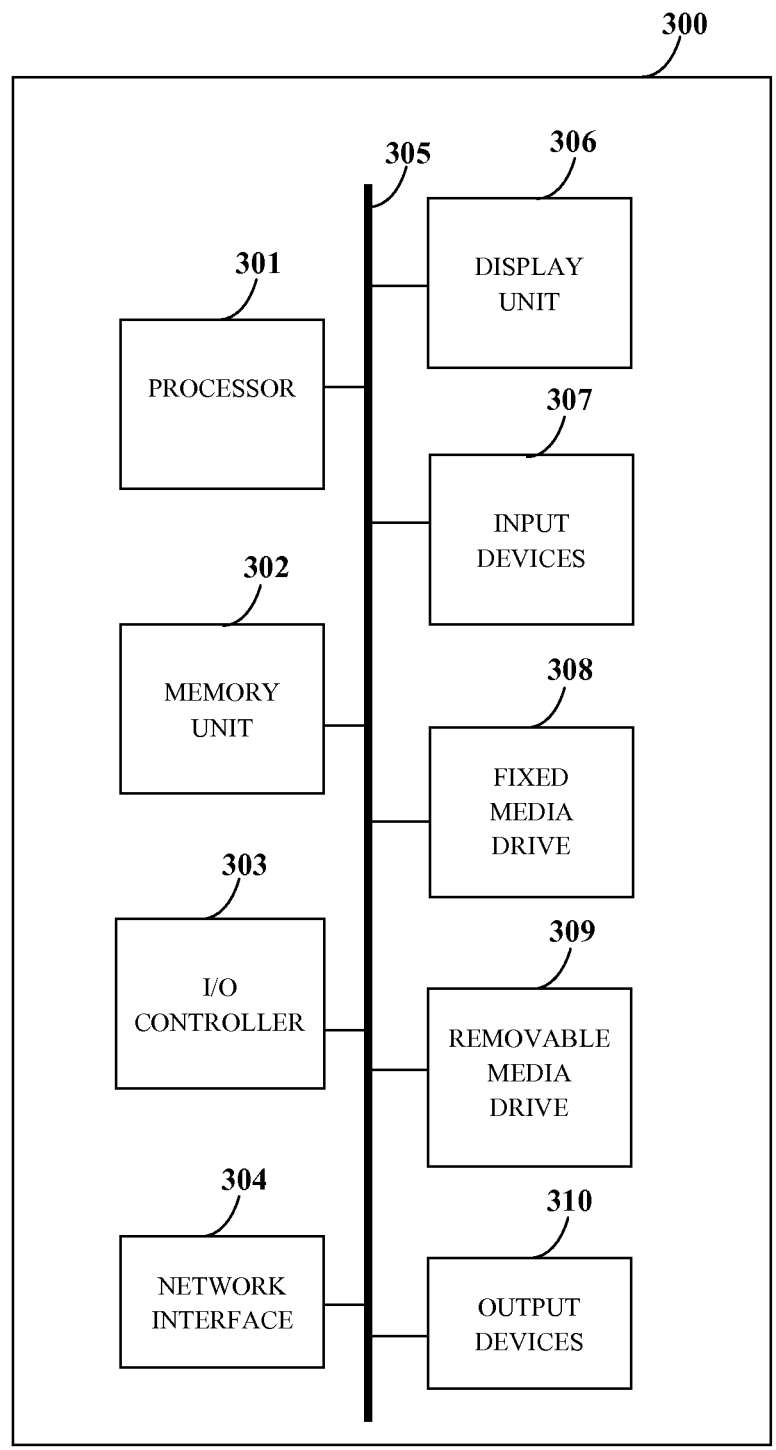
FIG. 3 exemplarily illustrates the architecture of a computer system employed by a security system, a data management server, and a security management application of the system disclosed herein.

FIG. 3 exemplarily illustrates the architecture of a computer system 300 employed by the security system 201, the data management server 209, and the security management application 212 of the system 200 disclosed herein. The security system 201, the data management server 209, and the security management application 212 of the system 200 exemplarily illustrated in FIG. 2 employ the architecture of the computer system 300 exemplarily illustrated in FIG. 3. The computer system 300 is programmable using a high level computer programming language. The computer system 300 may be implemented using programmed and purposeful hardware. The security system 201 communicates with the data management server 209 via the network 213, for example, a short range network or a long range network. The network 213 is, for example, the internet, a local area network, a wide area network, a wireless network, a mobile communication network, etc. The computer system 300 comprises, for example, a processor 301, a memory unit 302 for storing programs and data, an input/output (I/O) controller 303, a network interface 304, a data bus 305, a display unit 306, input devices 307, a fixed media drive 308, a removable media drive 309 for receiving removable media, output devices 310, etc.

The term "processor" refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 301 may also be implemented as a processor set comprising, for example, a general purpose microprocessor and a math or graphics co-processor. The processor 301 is selected, for example, from the Intel® processors such as the Itanium® microprocessor or the Pentium® processors, Advanced Micro Devices (AMD®) processors such as the Athlon® processor, UltraSPARC® processors, microSPARC™ processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The security system 201, the data management server 209, and the control device 211 implementing the security management application 212 are each not limited to a computer system 300 employing a processor 301. The computer system 300 may also employ a controller or a microcontroller.

The memory unit 302 is used for storing programs, applications, and data. For example, the transmission module 206 and the redirection module 207 of the security system 201 are stored in the memory unit 302 of the security system 201. The alerting module 209a of the data management server 209 is stored in the memory unit 302 of the data management server 209. The configuration and control module 212b of the security management application 212 is stored in the memory unit 302 of the control device 211. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301.

The network interface 304 enables connection of the computer system 300 to the network 213. For example, the security system 201, the data management server 209, and the control device 211 implementing the security management application 212 connect to the network 213 via their respective network interfaces 304. In an embodiment, the network interface 304 is provided as an interface card also referred to as a line card. The network interface 304 comprises, for example, one or more of an infrared (IR) interface, an interface implementing Wi-Fi® of the Wireless Ethernet Compatibility Alliance, Inc., a universal serial bus (USB) interface, a FireWire® interface of Apple, Inc., a Bluetooth® interface, an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high-speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 303 controls input actions and output actions performed by the security system 201, the data management server 209, and the security management application 212. The data bus 305 of the security system 201 permits communications between the modules, for example, 205a, 206, 207, etc., of the security system 201. The data bus 305 of the data management server 209 permits communications between the modules, for example, the alerting module 209a and the database 209b of the data management server 209. The data bus 305 of the control device 211 permits communications between the graphical user interface (GUI) 212a and the configuration and control module 212b of the security management application 212.

The display unit 306, for example, via the GUI 212a of the security management application 212, displays information, display interfaces, user interface elements such as text fields, checkboxes, text boxes, images, windows, videos, etc., for example, for displaying captured and monitored videos, events, alarm data, etc. The display unit 306 comprises, for example, a liquid crystal display, a plasma display, an organic light emitting diode (OLED) based display, etc. The input devices 307 are used for inputting data into the computer system 300. For example, the user enters security settings for the security system 201 into the GUI 212a of the security management application 212 using the input devices 307 of the control device 211. The input devices 307 are, for example, a keyboard such as an alphanumeric keyboard, a microphone for providing voice input, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly via the network 213. Computer applications and programs are executed by double clicking a related icon displayed on the display unit 306 using one of the input devices 307. The output devices 310 output the results of operations performed by the security system 201, the data management server 209, and the security management application 212. For example, the security management application 212 displays the received event data on the GUI 212a of the security management application 212 using the output devices 310 of the control device 211.

The processor 301 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., the Palm OS®, the Solaris operating system developed by Sun Microsystems, Inc., the Android operating system, the Windows Phone™ operating system of Microsoft Corporation, the BlackBerry® operating system of Research in Motion Limited, the iOS operating system of Apple Inc., the Symbian® operating system of Symbian Foundation Limited, etc. The computer system 300 employs the operating system for performing multiple tasks. The operating system is responsible for management and coordination of activities and sharing of resources of the computer system 300. The operating system further manages security of the computer system 300, peripheral devices connected to the computer system 300, and network connections. The operating system employed on the computer system 300 recognizes, for example, inputs provided by the users using one of the input devices 307, the output display, files, and directories stored locally on the fixed media drive 308, for example, a hard drive. The operating system on the computer system 300 executes different programs using the processor 301. The processor 301 and the operating system together define a computer platform for which application programs in high level programming languages are written.

The processor 301 of the security system 201 retrieves instructions for executing the modules, for example, 206 and 207 from the memory unit 302. The processor 301 of the data management server 209 retrieves instructions for executing the alerting module 209a from the memory unit 302. The processor 301 of the control device 211 retrieves instructions for executing the configuration and control module 212b of the security management application 212 from the memory unit 302. A program counter determines the location of the instructions in the memory unit 302. The program counter stores a number that identifies the current position in the program of each of the modules, for example, 205a, 206, 207, etc., of the security system 201, the alerting module 209a of the data management server 209, and the configuration and control module 212b of the security management application 212. The instructions fetched by the processor 301 from the memory unit 302 after being processed are decoded. The instructions are stored in an instruction register in the processor 301.

After processing and decoding, the processor 301 executes the instructions. For example, the alert generation module 205a of the security system 201 defines instructions for generating alerts for security using the simultaneously received event data and the recorded alarm data. The transmission module 206 of the security system 201 defines instructions for transmitting the simultaneously received event data and the recorded alarm data, and the generated alerts to the data management server 209 via the network 213 for processing, storage, and alerting the user's control device 211. In an embodiment, the transmission module 206 of each security system 201 in a network of security systems 201 defines instructions for transmitting the simultaneously received event data and the recorded alarm data, and the generated alerts from one or more of the active security systems 201 to the data management server 209 via the network 213 based on an active connection of the active security systems 201 to the network 213 through one or more connection modes, for example, a cellular data connection, a broadband connection, etc. In another embodiment, if the active connection of each of the other security systems 201 via other connection modes is disabled, the transmission module 206 of each of the other security systems 201 defines instructions for transmitting the simultaneously received event data and the recorded alarm data, and the generated alerts from the other security systems 201 to the active security systems 201 via the wireless access point 204 of each of the active security systems 201. In another embodiment, the redirection module 207 defines instructions for redirecting the connections of the electronic devices 210a and 210b from the gateway device 203 of an inactive security system 201, to the gateway device 203 of an active security system 201, via the wireless access point 204 of the active security system 201, if the inactive security system 201 fails.

The alerting module 209a of the data management server 209 defines instructions for transmitting the generated alerts to the control device 211 via the network 213. The configuration and control module 212b of the security management application 212 on the control device 211 defines instructions for accessing, configuring, and controlling each security system 201 through the wireless access point 204 via the GUI 212a of the security management application 212.

The processor 301 of the computer system 300 employed by the security system 201 retrieves the instructions defined by the alert generation module 205a, the transmission module 206, and the redirection module 207, and executes the instructions, thereby performing one or more processes defined by those instructions. The processor 301 of the computer system 300 employed by the data management server 209 retrieves the instructions defined by the alerting module 209a and executes the instructions, thereby performing one or more processes defined by those instructions. The processor 301 of the computer system 300 employed by the control device 211 retrieves instructions defined by the configuration and control module 212b of the security management application 212 and executes the instructions, thereby performing one or more processes defined by those instructions.

At the time of execution, the instructions stored in the instruction register are examined to determine the operations to be performed. The processor 301 then performs the specified operations. The operations comprise arithmetic operations and logic operations. The operating system of each security system 201 performs multiple routines for performing a number of tasks required to assign the input devices 307, the output devices 310, and memory for execution of the modules, for example, 205a, 206, 207, etc., of the security system 201. The operating system of the data management server 209 performs multiple routines for performing a number of tasks required to assign the input devices 307, the output devices 310, and memory for execution of the alerting module 209a of the data management server 209. The operating system of the control device 211 performs multiple routines for performing a number of tasks required to assign the input devices 307, the output devices 310, and memory for execution of the configuration and control module 212b of the security management application 212. The tasks performed by the operating system of each of the security system 201, the data management server 209, and the control device 211 comprise, for example, assigning memory to the respective modules, for example, 205a, 206, 207, 209a, and 212b, moving data between the memory unit 302 and disk units, and handling input/output operations. The operating system performs the tasks on request by the operations and after performing the tasks, the operating system transfers the execution control back to the processor 301. The processor 301 continues the execution to obtain one or more outputs. The outputs of the execution of the modules, for example, 205a, 206, 207, 209a, and 212b, of the security system 201, the data management server 209, and the security management application 212 respectively are displayed to the user on the display unit 306 of the security system 201, the data management server 209, and the control device 211 respectively.

For purposes of illustration, the detailed description refers to the security system 201, the data management server 209, and the security management application 212, each being run locally on the computer system 300, however the scope of the method and system 200 disclosed herein is not limited to the security system 201, the data management server 209, and the security management application 212, each being run locally on the computer system 300 via the operating system and the processor 301, but may be extended to run remotely over the network 213 by employing a web browser and a remote server, a mobile phone, or other computing devices. One or more portions of the computer system 300 may be distributed across one or more computer systems (not shown) coupled to the network 213.

Figure 4:
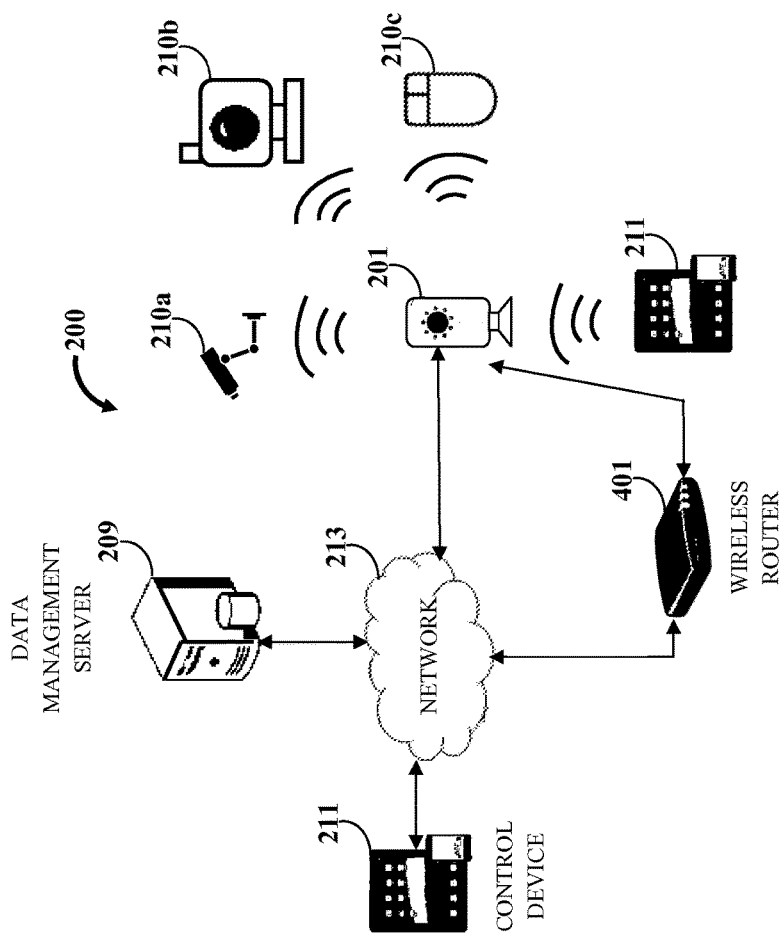
FIG. 4 exemplarily illustrates a first embodiment of the system for simultaneously capturing events and generating alerts for security.

FIG. 4 exemplarily illustrates a first embodiment of the system 200 for simultaneously capturing events and generating alerts for security. FIG. 4 exemplarily illustrates the security system 201 in direct communication with multiple electronic devices, for example, a surveillance device 210a, a camera 210b, and a sensor 210c and the control device 211, and also in communication with the data management server 209 and the control device 211 via the network 213. A wireless router 401 is operably connected to the security system 201 to establish the network 213. The data management server 209 stores alarm and video data, maintains device status and connection, and sends notifications or alerts to the control device 211 via the network 213. The security management application 212 on the control device 211 enables configuration of the security system 201, receives alerts such as alarm notifications from the data management server 209, and enables viewing of video data captured by the image capture device 202 of the security system 201 exemplarily illustrated in FIG. 2.

Consider an example for simultaneously capturing events and generating alerts for security of a building or a facility. The security system 201 is installed in a room. A user invokes the security management application 212 on his/her control device 211, for example, a tablet computer and connects wirelessly to the gateway device 203 of the security system 201 via the wireless access point 204 of the security system 201 as exemplarily illustrated in FIG. 2. The user configures security settings for the security system 201 via the graphical user interface (GUI) 212a of the security management application 212 to complete installation of the security system 201. Electronic devices, for example, a surveillance device 210a, a camera 210b, and a sensor 210c positioned in the room connect wirelessly to the gateway device 203 of the security system 201 via the wireless access point 204 of the security system 201. The security system 201 receives event data, for example, video data from the surveillance device 210a and the camera 210b, and sensor data such as motion information, temperature, pressure, etc., from the sensor 210c in the room and stores the event data in the data management server 209 via the network 213. The security management application 212 on the control device 211 accesses the event data from the database 209b via the network 213. In an embodiment, the security system 201 transmits the received event data to the control device 211 directly or via the network 213. The security system 201 monitors the room continuously and generates an alert when an unauthorized event or an unauthorized electronic device generates a security condition. On detection of the unauthorized event or an unauthorized electronic device, the security system 201 generates and transmits an alert message to the security management application 212 on the control device 211. The user may then deactivate the security system 201 and instruct the security system 201 to sound an alarm or transmit a notification to security personnel via the GUI 212a of the security management application 212 on the control device 211.

Figure 5:
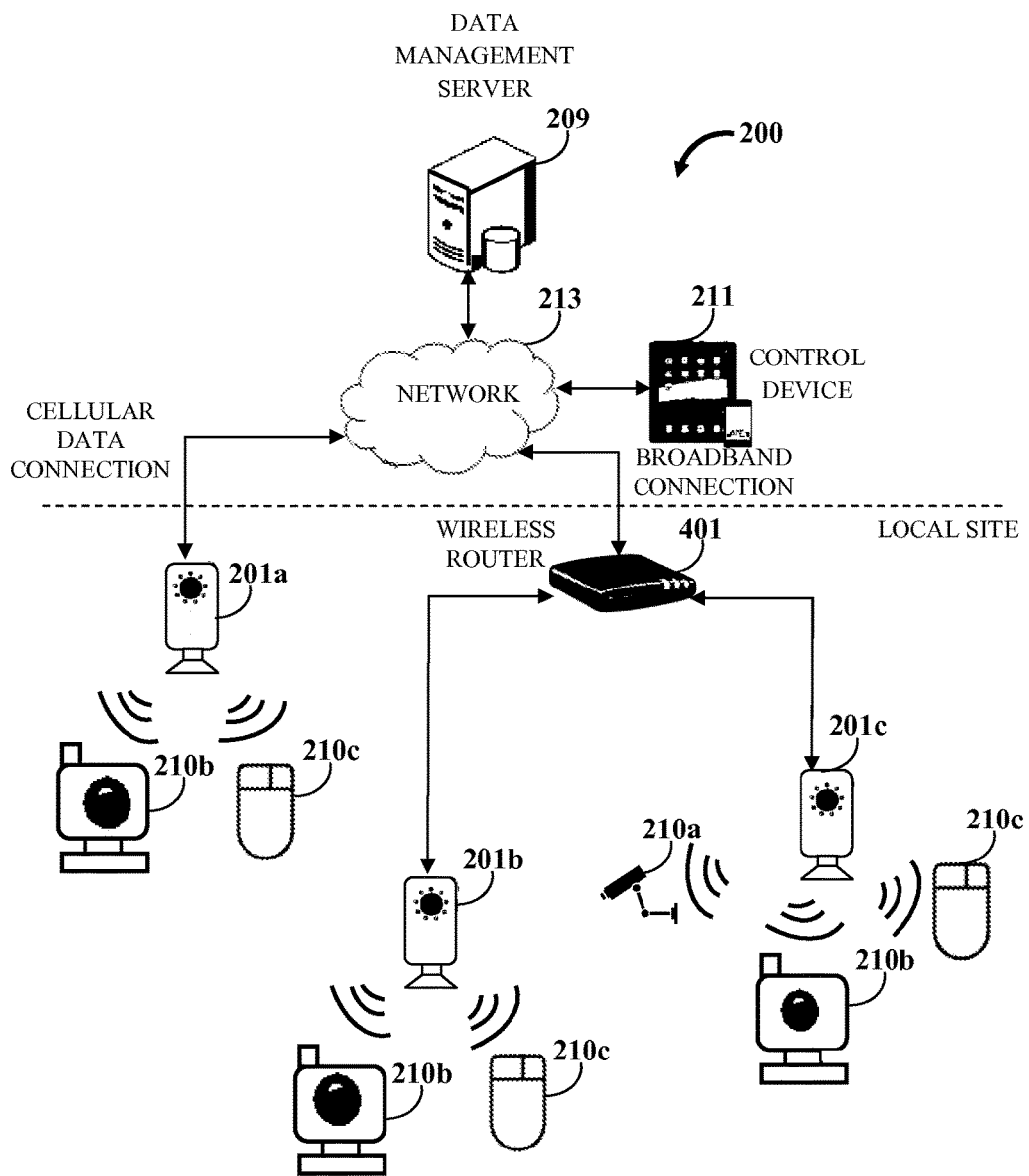
FIG. 5 exemplarily illustrates a second embodiment of the system for simultaneously and continuously capturing events and generating alerts for security.

FIG. 5 exemplarily illustrates a second embodiment of the system 200 for simultaneously and continuously capturing events and generating alerts for security. As exemplarily illustrated in FIG. 5, security systems 201a, 201b, and 201c are communicatively coupled to each other, where a first security system 201a communicates with the data management server 209 via the network 213 through a connection mode, for example, a cellular third generation (3G) or fourth generation (4G) data connection, while the second security system 201b and the third security system 201c communicate with the data management server 209 via the network 213 through a connection mode, for example, a broadband connection provided by the wireless router 401. Electronic devices, for example, 210b and 210c connect to the gateway device 203 of each of the security systems 201a, 201b, and 201c via the wireless access point 204 exemplarily illustrated in FIG. 2, of each of the security systems 201a, 201b, and 201c. Another electronic device 210a connects only to the gateway device 203 of the security system 201c via the wireless access point 204 of the security system 201c as exemplarily illustrated in FIG. 5. The user's control device 211 communicates with the data management server 209 via the network 213 as exemplarily illustrated in FIG. 5. The user may have a unified, single site alarm experience on the control device 211.

Figure 6:
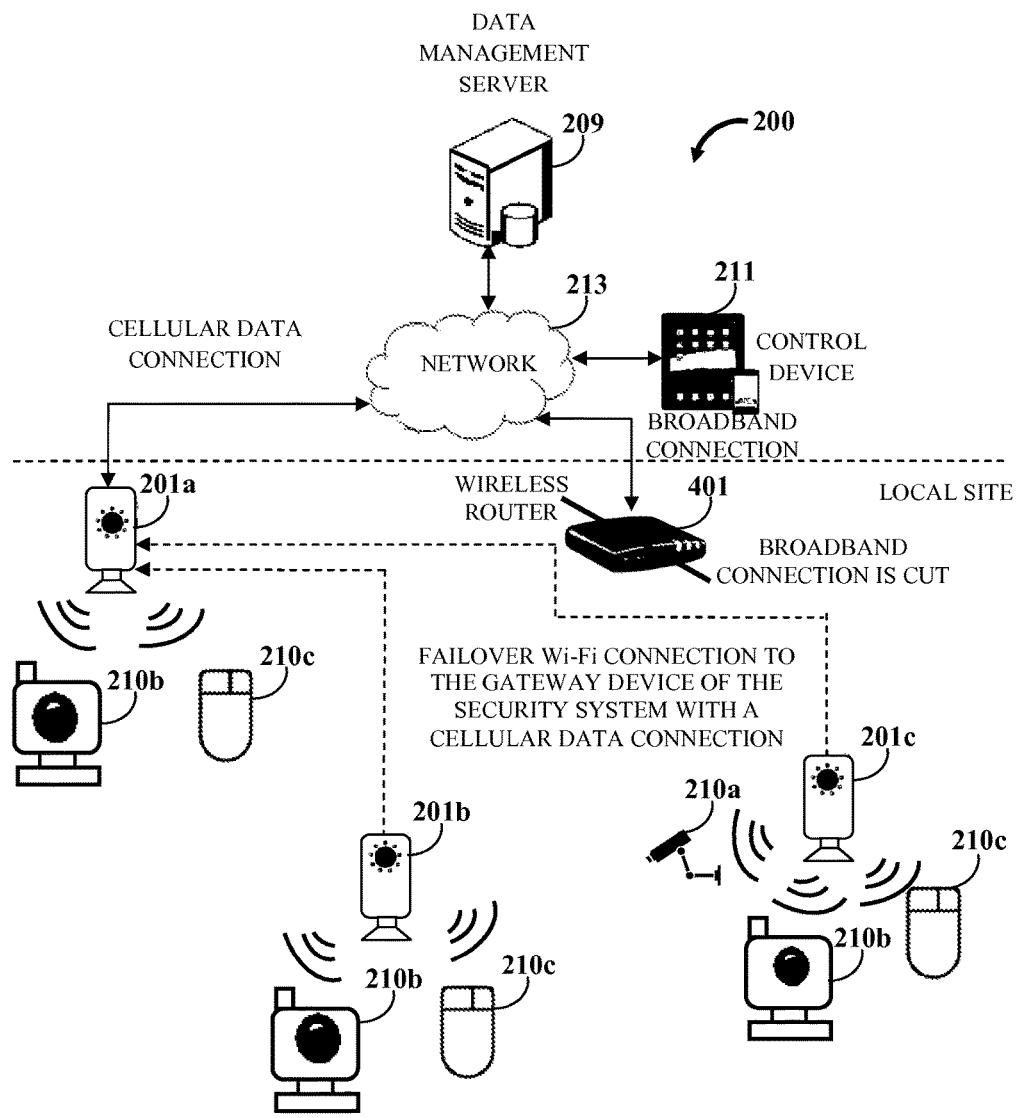
FIG. 6 exemplarily illustrates a third embodiment of the system for simultaneously and continuously capturing events and generating alerts for security.

FIG. 6 exemplarily illustrates a third embodiment of the system 200 for simultaneously and continuously capturing events and generating alerts for security. In this embodiment, the master gateway for each site is decentralized for better redundancy. That is, instead of having one master gateway, the system 200 disclosed herein provides multiple security systems 201a, 201b, and 201c that serve as multiple gateways at a site. This also provides multiple paths out on different gateways for increased robustness. As exemplarily illustrated in FIG. 6, the security systems 201a, 201b, and 201c are communicatively coupled to each other, where a first security system 201a communicates with the data management server 209 via a network 213 through a connection mode, for example, a cellular third generation (3G) or fourth generation (4G) data connection, while the second security system 201b and the third security system 201c initially communicate with the data management server 209 via the network 213 through a connection mode, for example, a broadband connection provided by the wireless router 401. In this embodiment, if the broadband connection to the network 213 is disabled, the second security system 201b and the third security system 201c fail over their connection, for example, a Wi-Fi® connection to the gateway device 203 exemplarily illustrated in FIG. 2, of the first security system 201a that is connected to the network 213 through the active cellular third generation (3G) or fourth generation (4G) data connection. The second security system 201b and the third security system 201c are redirected to communicate with the gateway device 203 of the first security system 201a. That is, when the active connection of the security systems 201b and 201c to the network 213 via one connection mode, for example, the broadband connection is disabled, the security systems 201b and 201c transmit their simultaneously received event data and the recorded alarm data, and the generated alerts to the active security system 201a via the wireless access point 204 of the active security system 201a. The active security system 201a then transmits the event data and the recorded alarm data, and the generated alerts received from the security systems 201b and 201c to the data management server 209 via the network 213 through the cellular third generation (3G) or fourth generation (4G) data connection.

Figure 7:
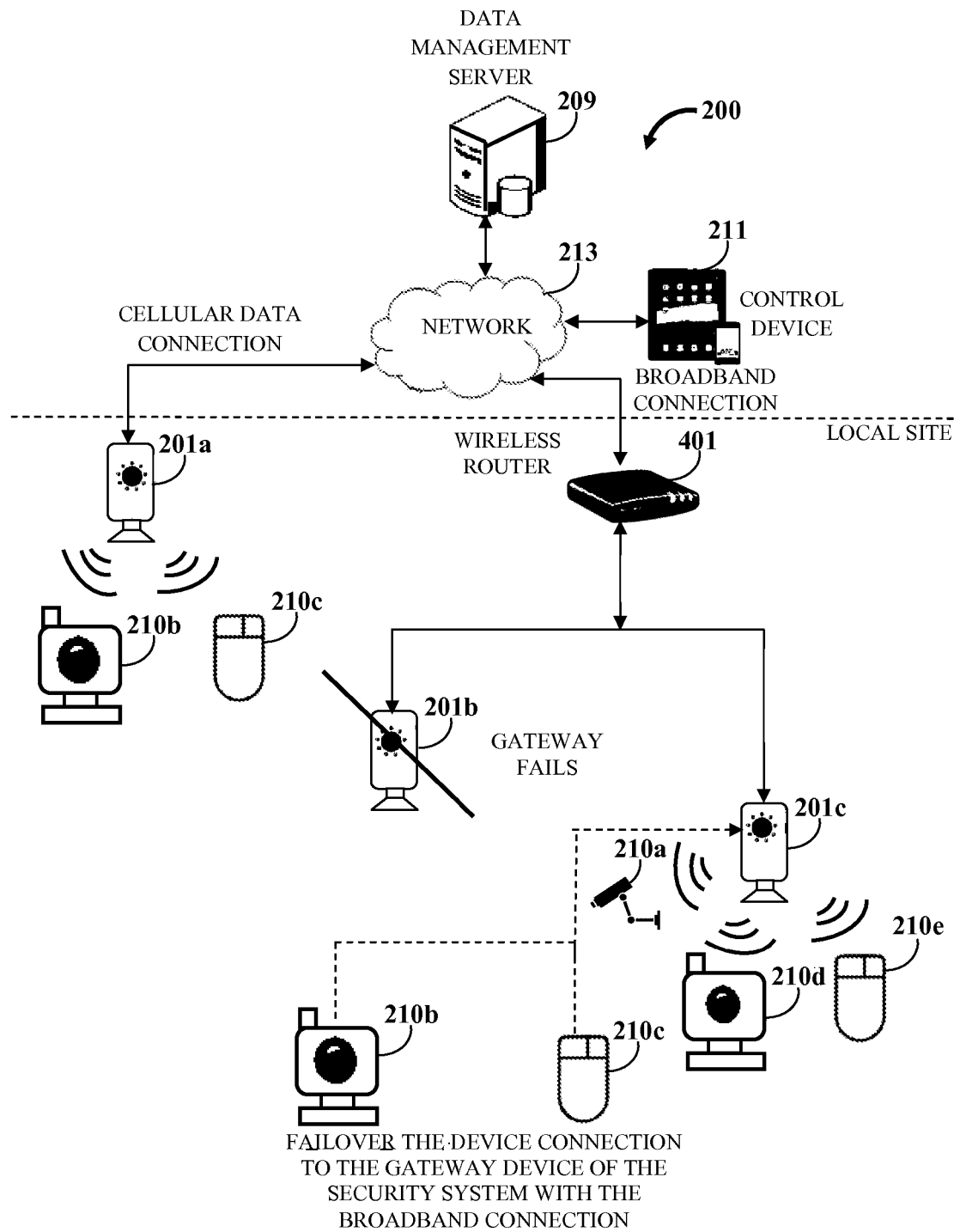
FIG. 7 exemplarily illustrates a fourth embodiment of the system for simultaneously and continuously capturing events and generating alerts for security.

FIG. 7 exemplarily illustrates a fourth embodiment of the system 200 for simultaneously and continuously capturing events and generating alerts for security. In this embodiment, the master gateway for each site is also decentralized for improved redundancy. That is, instead of having one master gateway, the system 200 disclosed herein provides multiple security systems 201a, 201b, and 201c that serve as multiple gateways at a site. This allows electronic devices, for example, 210b and 210c that connect to the security system 201b to fail over to another security system, for example, 201c when the security system 201b fails, for example, due to a hardware failure or a connection failure.

As exemplarily illustrated in FIG. 7, the security systems 201a, 201b, and 201c are communicatively coupled to each other, where a first security system 201a communicates with the data management server 209 via the network 213 through a connection mode, for example, a cellular data connection, while the second security system 201b and the third security system 201c initially communicate with the data management server 209 via the network 213 through a connection mode, for example, a broadband connection provided by the wireless router 401. In this example, the electronic devices 210b and 210c initially connect to the security system 201b. If the security system 201b fails, the electronic devices 210b and 210c fail over their device connection from the gateway device 203 exemplarily illustrated in FIG. 2 of the security system 201b to the gateway device 203 of the security system 201c that is connected to the network 213 through the broadband connection. That is, if the security system 201b fails, the electronic devices 210b and 210c that connect to the gateway device 203 of the security system 201b are redirected to the gateway device 203 of the security system 201c. Therefore, in addition to the electronic devices 210a, 210d, and 210e that connect to the active security system 201c, the electronic devices 210b and 210c also connect to the active security system 201c. The active security system 201c then transmits the simultaneously received event data and the recorded alarm data, and the generated alerts received from the electronic devices 210a, 210b, 210c, 210d, and 210e to the data management server 209 via the network 213 through the broadband connection for processing, storage, and alerting the user's control device 211.

The data management server 209 virtualizes and ties together the security systems, for example, 201a, 201b, and 201c at different zones from each site to create an improved integrated single alarm system experience for the user, to provide the user with an experience similar to a convention alarm where there is one alarm system the user manages for a single site. The data management server 209 also provides off-site backup of alarm and video events. When an event is triggered, the data management server 209 stores the video and alarm events off-site for safe keeping.

It will be readily apparent that the various methods, algorithms, and computer programs disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Other object-oriented, functional, scripting, and/or logical programming languages may also be used. The computer program codes or software programs may be stored on or in one or more mediums as object code. Various aspects of the method and system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof. The computer program product disclosed herein comprises computer executable instructions embodied in a non-transitory computer readable storage medium, wherein the computer program product comprises one or more computer program codes for implementing the processes of various embodiments.

Where databases are described such as the database 209*b*, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices may comprise processors, for example, the Intel® processors, Advanced Micro Devices (AMD®) processors, UltraSPARC® processors, Hp® processors, International Business Machines (IBM®) processors, RISC based computer processors of ARM Holdings, Motorola® processors, etc., that are adapted to communicate with the computers. In an embodiment, each of the computers is equipped with a network communication device, for example, a network interface card, a modem, or other network connection device suitable for connecting to a network. Each of the computers and the devices executes an operating system, for example, the Linux® operating system, the Unix® operating system, any version of the Microsoft® Windows® operating system, the Mac OS of Apple Inc., the IBM® OS/2, the Palm OS®, the Solaris operating system developed by Sun Microsystems, Inc., or any other operating system. Handheld devices execute operating systems, for example, the Android operating system, the Windows Phone™ operating system of Microsoft Corporation, the BlackBerry® operating system of Research in Motion Limited, the iOS operating system of Apple Inc., the Symbian® operating system of Symbian Foundation Limited, etc. While the operating system may differ depending on the type of computer, the operating system will continue to provide the appropriate communications protocols to establish communication links with the network. Any number and type of machines may be in communication with the computers.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A method for simultaneously and continuously capturing events and generating alerts for security, comprising:

providing a control device comprising one of a mobile phone, an internet enabled mobile device, a personal computer, a tablet computing device, a mobile computer, a smart phone, a laptop, a personal digital assistant, a touch centric device, a workstation, a client device, a portable electronic device, a network enabled computing device, an interactive network enabled communication device, for wirelessly configuring and setting up one or more security systems via wireless access points of said security systems;

said one or more security systems comprising an image capture device, said wireless access point, a gateway device and one or more alarm devices, wherein said one or more security systems are communicatively coupled to each other via said wireless access point and to a data management server via a network through one or more connection modes, wherein each of said security systems further comprises at least one processor configured to simultaneously capture said events and generate said alerts for said security, wherein said image capture device is configured to capture event data associated with said events, wherein said wireless access point is integrated in said image capture device, wherein said wireless access point is configured to directly connect said control device and one or more electronic devices to said security system, and route said control device and said electronic devices to a network, wherein said gateway device is integrated in said image capture device, wherein said gateway device is configured to communicate with said image capture device, said control device, said one or more of said electronic devices, and monitor, manage, and receive said event data associated with said events from said image capture device and from said one or more of said electronic devices, wherein said control device and said one or more of said electronic devices are configured to connect to said gateway device of said security system via said wireless access point, wherein said electronic devices are connected directly to a single gateway device and to said network via a single connection path, wherein said electronic devices do not have a normally available second connection path to said network via a second gateway device, wherein said one or more alarm devices are operably connected to said gateway device, and wherein said one or more alarm devices are configured to record alarm data based on detection of one or more security conditions;

simultaneously receiving, by said gateway device of each of said security systems, said event data associated with said events from said image capture device of said each of said security systems, said event data associated with said events from said one or more of said electronic devices connected to said each of said security systems, and said alarm data recorded by said one or more alarm devices connected to said each of said security systems;

generating said alerts for said security by an alert generation module of said one or more alarm devices of said each of said security systems using said simultaneously received event data associated with said events and said simultaneously received alarm data; and transmitting, by a transmission module of each of said security systems, said simultaneously received event data associated with said events, said simultaneously received alarm data, and said generated alerts to said data management server via said network based on an active connection of said each of said security systems to said network using said one or more of said connection modes, wherein if said network connection of any of said security systems fails, said simultaneously received event data associated with said events, said simultaneously received alarm data, and said alerts generated by said alert generation module of said one or more alarm devices of said security systems with said failed network connection is transmitted by said gateway devices of said security systems with said failed network connection to said gateway device of one or more of said security systems that still have said active network connection with said data management server.

2. The method of claim 1, further comprising integrating an energy storage device in each of said one or more of said security systems for powering said each of said one or more of said security systems and sustaining said active connection of said each of said one or more of said security systems to said network via said one or more of said connection modes.

3. The method of claim 1, further comprising processing and storing said simultaneously received event data associated with said events, said simultaneously received alarm data, and said generated alerts by said data management server in a database, wherein said data management server is accessible by said control device and said one or more of said electronic devices via said network.

4. The method of claim 1, further comprising transmitting said received alerts by said data management server to said control device via said network.

5. The method of claim 1, further comprising providing a security management application executable by at least one processor on said control device configured to communicate with said each of said security systems via said wireless access point of said each of said security systems, wherein said security management application is configured to access, configure, and control said each of said security systems through said wireless access point of said each of said security systems.

6. The method of claim 1, wherein said event data associated with said events comprises one of image data, video data, audiovisual data, multimedia data, and any combination thereof.

7. The method of claim 1, wherein said connection modes comprise a cellular data connection and a broadband connection.

8. A system for simultaneously and continuously capturing events and generating alerts for security, comprising:

a control device comprising one of a mobile phone, an internet enabled mobile device, a personal computer, a tablet computing device, a mobile computer, a smart phone, a laptop, a personal digital assistant, a touch centric device, a workstation, a client device, a portable electronic device, a network enabled computing device, an interactive network enabled communication device, for wirelessly configuring and setting up one or more security systems via wireless access points of said security systems;

said one or more security systems comprising an image capture device, said wireless access point, a gateway device and one or more alarm devices, wherein said one or more security systems are configured to communicate with a data management server via a network, wherein each of said security systems further comprises:

at least one processor configured to execute modules of said security system;

a non-transitory computer readable storage medium communicatively coupled to said at least one processor, said non-transitory computer readable storage medium configured to store said modules of said security system;

said image capture device configured to capture event data associated with said events;

said wireless access point integrated in said image capture device, wherein said wireless access point is configured to directly connect said control device and one or more electronic devices to said security system, and route said control device and said electronic devices to said network;

said gateway device integrated in said image capture device, wherein said gateway device is configured to communicate with said image capture device, said control device, and said one or more electronic devices, and monitor, manage, and receive said event data associated with said events from said image capture device and from said one or more of said electronic devices, wherein said control device and said one or more of said electronic devices are configured to connect to said gateway device of said security system via said wireless access point, wherein said electronic devices are connected directly to a single gateway device and to said network via a single connection path, wherein said electronic devices do not have a normally available second connection path to said network via a second gateway device;

said one or more alarm devices operably connected to said gateway device, said one or more alarm devices configured to record alarm data based on detection of one or more security conditions, simultaneously with said capture of said event data associated with said events performed by said image capture device and said one or more of said electronic devices, wherein each of said one or more alarm devices comprises an alert generation module configured to generate said alerts for said security using said simultaneously received event data and said recorded alarm data; and a transmission module configured to transmit said simultaneously received event data, said simultaneously received alarm data, and said generated alerts from said each of said security systems to said data management server via said network based on an active connection of said each of said security systems to said network using said one or more of said connection modes, wherein if said network connection of any of said security systems fails, said simultaneously received event data associated with said events, said simultaneously received alarm data, and said alerts generated by said alert generation module of said one or more alarm devices of said security systems with said failed network connection is transmitted by said gateway devices of said security systems with said failed network connection to said gateway device of one or more of said security systems that still have said active network connection with said data management server; and said data management server accessible by said control device and said one or more of said electronic devices via said network, said data management server comprising at least one processor configured to process said simultaneously received event data, said simultaneously received alarm data, and said generated alerts in communication with said one or more of said security systems.

9. The system of claim 8, wherein said data management server further comprises a database configured to store said simultaneously received event data, said simultaneously received alarm data, and said generated alerts.

10. The system of claim 8, wherein said data management server further comprises an alerting module configured to transmit said received alerts to said control device via said network.

11. The system of claim 8, wherein said event data associated with said events comprises one of image data, video data, audiovisual data, multimedia data, and any combination thereof.

12. The system of claim 8, further comprising a security management application executable by at least one processor on said control device configured to communicate with said each of said security systems via said wireless access point of said each of said security systems, wherein said security management application comprises a configuration and control module configured to access, configure, and control said each of said security systems through said wireless access point via a graphical user interface of said security management application.

13. The system of claim 8, wherein said connection modes comprise a cellular data connection and a broadband connection.

14. The system of claim 8, wherein said each of said security systems further comprises an energy storage device configured to power said each of said security systems and sustain an active connection of said each of said security systems to said network via one or more connection modes, wherein said connection modes comprise a cellular data connection and a broadband connection.

15. A method for simultaneously and continuously capturing events and generating alerts for security, comprising:

providing a control device comprising one of a mobile phone, an internet enabled mobile device, a personal computer, a tablet computing device, a mobile computer, a smart phone, a laptop, a personal digital assistant, a touch centric device, a workstation, a client device, a portable electronic device, a network enabled computing device, an interactive network enabled communication device, for wirelessly configuring and setting up one or more security systems via wireless access points of said security systems;

said one or more security systems comprising an image capture device, said wireless access point, a gateway device and one or more alarm devices, wherein said one or more security systems are communicatively coupled to each other via said wireless access point and to a data management server via a network through one or more connection modes, wherein each of said security systems further comprises at least one processor configured to simultaneously capture said events and generate said alerts for said security, wherein said image capture device is configured to capture event data associated with said events, wherein said wireless access point is integrated in said image capture device, wherein said wireless access point is configured to directly connect said control device and one or more electronic devices to said security system, and route said control device and said electronic devices to a network, wherein said gateway device is integrated in said image capture device, wherein said gateway device is configured to communicate with said image capture device, said control device, said one or more of said electronic devices, and monitor, manage, and receive said event data associated with said events from said image capture device and from said one or more of said electronic devices, wherein said control device and said one or more of said electronic devices are configured to connect to said gateway device of said security system via said wireless access point, wherein said electronic devices are connected directly to a single gateway device and to said network via a single connection path, wherein said electronic devices do not have a normally available second connection path to said network via a second gateway device, wherein said one or more alarm devices are operably connected to said gateway device, and wherein said one or more alarm devices are configured to record alarm data based on detection of one or more security conditions;

simultaneously receiving, by said gateway device of each of said security systems, said event data associated with said events from said image capture device of said each of said security systems, said event data associated with said events from said one or more of said electronic devices connected to said each of said security systems, and said alarm data recorded by said one or more alarm devices connected to said each of said security systems;

generating said alerts for said security by an alert generation module of said one or more alarm devices of said each of said security systems using said simultaneously received event data associated with said events and said simultaneously received alarm data; and transmitting, by a transmission module of each of said security systems, said simultaneously received event data associated with said events, said simultaneously received alarm data, and said generated alerts to said data management server via said network based on an active connection of said each of said security systems to said network using said one or more of said connection modes, wherein if said gateway device of any of said security systems fails, a device connection from said image capture device of said security system with said failed gateway device, a device connection from said one or more of said electronic devices connected to said security system with said failed gateway device, and a device connection from said one or more alarm devices of said security system with said failed gateway device are all redirected to said gateway device of one or more of said security systems that still have a functioning gateway device.

16. The method of claim 15, wherein said data management server comprises at least one processor configured to process and store said simultaneously received event data associated with said events, said simultaneously received alarm data, and said generated alerts in a database, and wherein said data management server is accessible by said control device and said electronic devices via said network.

17. The method of claim 16, wherein said data management server is configured to transmit said received alerts to said control device via said network.

18. The method of claim 15, further comprising providing a security management application executable by at least one processor on said control device configured to communicate with said each of said security systems via said wireless access point of each of said security systems, wherein said security management application is configured to access, configure, and control each of said security systems through said wireless access point of each of said security systems.

19. The method of claim 15, wherein said event data associated with said events comprises one of image data, video data, audiovisual data, multimedia data, and any combination thereof.

20. A system for simultaneously and continuously capturing events and generating alerts for security, comprising:

a control device comprising one of a mobile phone, an internet enabled mobile device, a personal computer, a tablet computing device, a mobile computer, a smart phone, a laptop, a personal digital assistant, a touch centric device, a workstation, a client device, a portable electronic device, a network enabled computing device, an interactive network enabled communication device, for wirelessly configuring and setting up one or more security systems via wireless access points of said security systems;

said one or more security systems comprising an image capture device, said wireless access point, a gateway device and one or more alarm devices, wherein said one or more security systems are configured to communicate with a data management server via a network, wherein each of said security systems further comprises:

at least one processor configured to execute modules of said security system;

a non-transitory computer readable storage medium communicatively coupled to said at least one processor, said non-transitory computer readable storage medium configured to store said modules of said security system;

said image capture device configured to capture event data associated with said events;

said wireless access point integrated in said image capture device, wherein said wireless access point is configured to directly connect said control device and one or more electronic devices to said security system, and route said control device and said electronic devices to said network;

said gateway device integrated in said image capture device, wherein said gateway device is configured to communicate with said image capture device, said control device, and said one or more electronic devices, and monitor, manage, and receive said event data associated with said events from said image capture device and from said one or more of said electronic devices, wherein said control device and said one or more of said electronic devices are configured to connect to said gateway device of said security system via said wireless access point, wherein said electronic devices are connected directly to a single gateway device and to said network via a single connection path, wherein said electronic devices do not have an alternate a normally available second connection path to said network via a second gateway device;

said one or more alarm devices operably connected to said gateway device, said one or more alarm devices configured to record alarm data based on detection of one or more security conditions, simultaneously with said capture of said event data associated with said events performed by said image capture device and said one or more of said electronic devices, wherein each of said one or more alarm devices comprises an alert generation module configured to generate said alerts for said security using said simultaneously received event data and said recorded alarm data; and a transmission module configured to transmit said simultaneously received event data, said simultaneously received alarm data, and said generated alerts from said each of said security systems to said data management server via said network based on an active connection of said each of said security systems to said network using said one or more of said connection modes, wherein if said gateway device of any of said security systems fails, a device connection from said image capture device of said security system with said failed gateway device, a device connection from said one or more of said electronic devices connected to said security system with said failed gateway device, and a device connection from said one or more alarm devices of said security system with said failed gateway device are all redirected, by a redirection module of said security system with said failed gateway device, to said gateway device of one or more of said security systems that still have a functioning gateway device;

said data management server accessible by said control device and said one or more of said electronic devices via said network, said data management server comprising at least one processor configured to process said simultaneously received event data, said simultaneously received alarm data, and said generated alerts in communication with said one or more of said security systems.

21. The system of claim 20, wherein said data management server further comprises a database configured to store said simultaneously received event data, said simultaneously received alarm data, and said generated alerts.

22. The system of claim 20, wherein said data management server further comprises an alerting module configured to transmit said received alerts to said control device via said network.

23. The system of claim 20, wherein said event data associated with said events comprises one of image data, video data, audiovisual data, multimedia data, and any combination thereof.

24. The system of claim 20, further comprising a security management application executable by at least one processor on said control device configured to communicate with said each of said security systems via said wireless access point of said each of said security systems, wherein said security management application comprises a configuration and control module configured to access, configure, and control said each of said security systems through said wireless access point via a graphical user interface of said security management application.

25. The system of claim 20, wherein said connection modes comprise a cellular data connection and a broadband connection.

26. The system of claim 20, wherein said each of said security systems further comprises an energy storage device configured to power said each of said security systems and sustain an active connection of said each of said security systems to said network via one or more connection modes, wherein said connection modes comprise a cellular data connection and a broadband connection.

* * * * *

UNITED STATES PATENT AND TRADEMARK OFFICE
CERTIFICATE OF CORRECTION

PATENT NO. : 10,319,202 B2
APPLICATION NO. : 13/965196
DATED : June 11, 2019
INVENTOR(S) : Herman Yau and Ronald G. Pace Page 1 of 1

It is certified that error appears in the above-identified patent and that said Letters Patent is hereby corrected as shown below:

In the Claims

Claim 20, Column 26, Line 60: After "have" delete "an alternate".

Signed and Sealed this
Tenth Day of September, 2019

Andrei Iancu
*Director of the United States Patent and Trademark Office*